May 26, 1970     W. L. HACK ET AL     3,514,128
WELDED JOINT

Original Filed Aug. 23, 1962     3 Sheets-Sheet 1

INVENTORS
WILLIAM L. HACK
JOHN A. STEIN
BY RODERICK G. ROHRBERG

ATTORNEY

INVENTORS
WILLIAM L. HACK
JOHN A. STEIN
BY RODERICK G. ROHRBERG

ATTORNEY

INVENTORS
WILLIAM L. HACK
JOHN A. STEIN
BY RODERICK G. ROHRBERG

ATTORNEY 3,514,128
WELDED JOINT
William L. Hack, Tulsa, Okla., and John A. Stein and Roderick G. Rohrberg, Torrance, Calif., assignors to North American Rockwell Corporation, a corporation of Delaware
Original application Aug. 23, 1962, Ser. No. 218,924, now Patent No. 3,344,498, dated Oct. 3, 1967. Divided and this application Feb. 27, 1967, Ser. No. 618,671
Int. Cl. F16l 3/04, 5/00, 41/00
U.S. Cl. 285—158
11 Claims

ABSTRACT OF THE DISCLOSURE

The disclosure is of a structural connection between a metal tubular conduit and a double-walled lightweight steel panel such as honeycomb core sandwich type panel used in modern missiles and aircraft. A hole in the bulkhead is provided with a flanged collar concentric with another flanged collar on the conduit. With the cylindrical shaped flanges on both stated collars in close alignment and continuous circumferential load-transmitting contact, welding heat is applied progressively along the distal edges of both flanges to join the two, whereby the weld seam is spaced apart from both the conduit and the panel. The deleterious effects of high welding heat on both stated components are thus avoided in the resulting joint.

This is a division of copending application Ser. No. 218,924, filed Aug. 23, 1962, now U.S. Pat. No. 3,344,498, issued Oct. 3, 1967.

This invention relates to an improved type of joint such as to secure tubular conduits or the like to bulkheads or other supporting structure through which such conduits are required to penetrate, and especially where such bulkheads are of composite thin-walled or otherwise heat-sensitive construction.

SUMMARY OF INVENTION

According to a preferred embodiment of this invention, there is provided an improved joint for connection of panel-like structure having particular sensitivity to the application of welding heat with conduits or the like required to penetrate through such panels and requiring the joint to be completed while both the panels and the conduits are otherwise completely installed in a crowded structural environment. The resulting joint permits accurate alignment and great strength as well as adequate sealing to prevent leakage from the conduit to the surrounding area from one side of the panel to the other through the joint. Moreover, the joint thus achieved is welded by application of heat to form a weld bead spacially isolated from both the conduit and the bulkhead such as would otherwise weaken or damage either stated component. The joint is formed by initially forming a hole through the bulkhead and permanently securing a reinforcing ring within the bulkhead and circumferentially surrounding the hole therethrough. In one embodiment, the stated reinforcing ring is provided with a generally cylindrical flange extending outwardly from one surface of the double-walled bulkhead. The conduit is provided with a sleeve or ferrule permanently secured on the outer conduit surface and co-axial therewith. The stated ferrule has a generally cylindrical flange spaced apart from the outer conduit surface and adapted to fit in substantially uniform contact with the mentioned flange of the reinforcing ring whereby the distal edges of both stated flanges are substantially co-planar. The joint is completed by application of welding heat simultaneously to both stated distal edges whereby the flanges are joined by a burndown weld.

DETAILED DESCRIPTION

Figure 1:
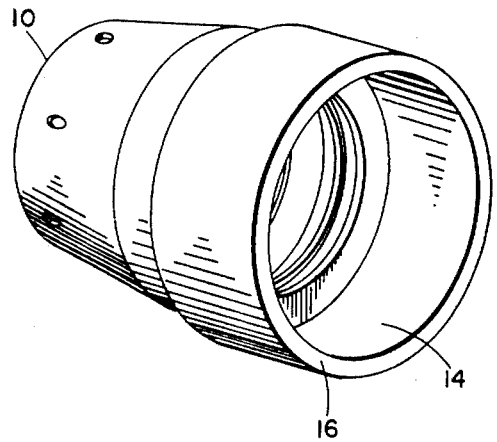
FIG. 1 shows a perspective view of a ferrule adapted for use according to the inventive principles taught herein.
Figure 2:
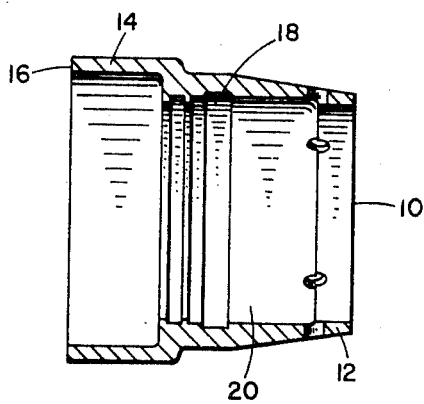
FIG. 2 shows a cross-sectional view taken along an imaginary plane diametrally through the center of the ferrule shown in FIG. 1.

Referring to the drawings described above and particularly to FIGS. 1 and 2, it may be seen that the inventive concept disclosed herein includes intermediate connection means in the form of a ferrule or annular collar 10 having a bearing portion 12 and a flange portion 14 terminating in a distal edge 16 having a thickness which may be substantially less than that of bearing portion 12. Bearing portion 12, which is adapted to contact a tube, conduit, or the like may be provided with one or more grooves or annular cavities such as reference numerals 18 and 20 to accommodate brazing alloys when attachment of ferrule 10 to the stated tube or conduit is accomplished by brazing. However, it will be understood that the scope of the inventive concept in this case is not limited to the use of brazed attachment between ferrule 10 and the stated conduit or the like. Thus, where threaded connection, shrink-fitting, or welding is preferred in place of brazing, for example, grooves 18 and 20 may be replaced by threads or omitted entirely.

Figure 2A:
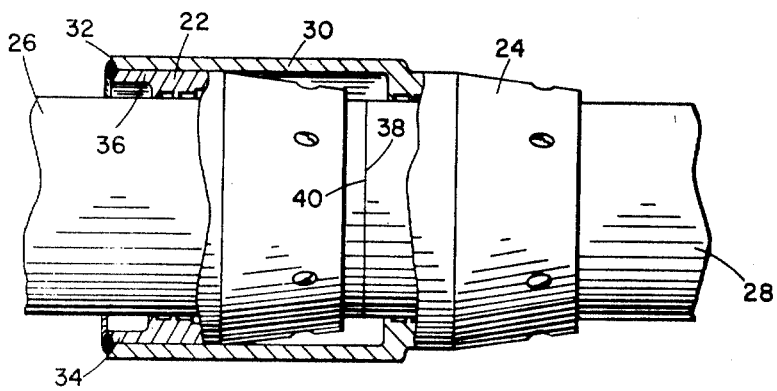
FIG. 2a is a cross-sectional view taken on a vertical plane through the center of a conduit coupling or union incorporating the structure shown in FIGS. 1 and 2.

An example of a conduit coupling illustratively incorporating a pair of ferrules 22 and 24 generally similar to ferrule 10 described above and secured to conduits 26 and 28 is shown by FIG. 2a. In forming the joint shown by FIG. 2a, ferrules 22 and 24 may be separately brazed, welded or otherwise secured to conduits 26 and 28, respectively, using bench or laboratory equipment prior to being permanently joined in the system of which the conduits may form a part. It may be seen from the stated figure that ferrule 22 is sized to fit within flange portion 30 of ferrule 24 and proximate thereto whereby distal edge 32 of flange portion 30 is substantially even and coplanar with distal edge 34 on flange portion 36 of ferrule 22 when the abutting ends 38 and 40 of conduits 26 and 28, respectively, are in substantially uniform circumferential contact. With the component parts of the coupling connection shown by FIG. 2a in the stated relationship and operatively related to the system within which conduits 26 and 28 form a part, in-place welding or brazing between flange portions 30 and 36 may be accomplished to join the same together. Welding may be accomplished either by simultaneously applying welding heat to distal edges 32 and 34, or by applying heat to the outer surface of flange 30 and burning through the material therein to fuse the same to flange 36. However, the simultaneous burndown welding of flanges 30 and 36 by application of welding heat to distal edges 32 and 34 is preferable because separation of conduits 26 and 28 may be effected by removal of the weld bead, after which rejoinder of the conduits may be accomplished by burndown welding of the same flanges.

Figure 3:
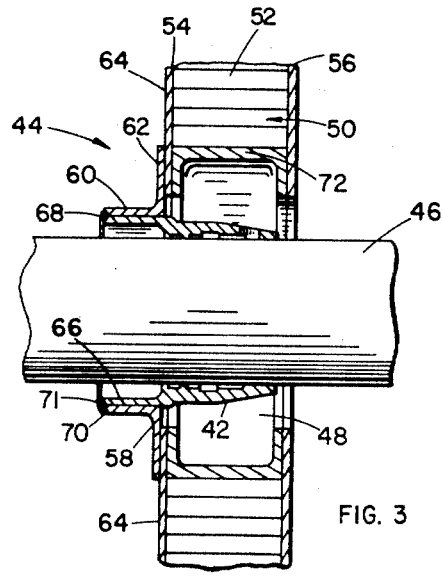
FIG. 3 shows a side elevational view, partly in crosssection, through a bulkhead support fitting formed according to the inventive principles taught herein.

Referring to FIG. 3, use of a ferrule or collar 42 generally similar in form to ferrule 10 described above and shown in FIGS. 1 and 2 may be seen incorporated in a bulkhead connection or support generally designated by reference numeral 44. As seen from FIG. 3, ferrule 42 may be preplaced on any elongate member such as a tube, conduit, or the like as indicated by reference numeral 46 and secured thereto by suitable means such as welding, brazing, shrink-fitting, roll swaging, or other permanent attaching method. This step may be accomplishing using bench methods and equipment permitting a joint having superior strength and reliability between ferrule 42 and elongate tube or conduit 46, after which the stated components may be situated within the frame or vehicle and held in the position corresponding with its desired final relationship with surrounding structure during the ensuing installation steps. Thus, in the illustrative example of FIG. 3, conduit 46 is positioned within an aperture or opening 48 in a bulkhead or panel generally designated by numeral 50, through which the conduit is required to pass.

In the example shown by FIG. 3, panel 50 illustratively comprises a panel of sandwich type construction having low-density core material 52 of substantially uniform thickness with relatively higher density face sheets 54 and 56 permanently joined to the core material on either side thereof by bonding, brazing or the like. Panel and bulkhead material of the type illustrated by panel 50 and used extensively in modern supersonic aerial and orbital vehicles typically comprises advanced alloy stainless steels of thin-walled construction characterized by extreme sensitivity to the application of heat. Where such panels are required to be pierced by elongate members such as tubes, lines, conduits, or the like which derive their support from structural attachment to the panels or bulkhead thus penetrated, avoidance of the direct application of welding heat on such panels is of paramount importance to prevent the weakening and distortion effects which otherwise would result from such heat. The novel arrangement of parts shown in FIG. 3 avoids application of welding heat directly upon panel 50 by providing aperture 48 with a mounting ring or bushing 58 comprising a flange portion 60 and a base portion 62. As shown by FIG. 3 base portion 62 of bushing 58 is initially secured to a surface 64 of face sheet 54 by suitable means such as clamping, bonding, brazing, or the like, as a result of which mounting ring 58 is permanently secured to panel 50 in the desired position of alignment with respect to aperture 48 in the stated panel. Thereafter, tube or conduit 46 having ferrule 42 previously joined thereto at the predetermined required location is positioned in desired final relationship within aperture 48 and with respect to panel 50. In the stated relationship, flange portion 66 of ferrule 42 is sized to fit within flange portion 60 of mounting ring 58 and in substantially uniform circumferential contact therewith as shown by FIG. 3. Also, where joinder of flanges 60 and 66 is accomplished by a burndown weld, distal edges 68 and 70 of flange portions 60 and 66, respectively, are required to be in substantially the same plane and proximate each other whereby the application of welding heat to edges 68 and 70 simultaneously will fuse the material forming an annular weld bead joining flanges 60 and 66 to each other.

It may be seen from FIG. 3 that the structural arrangement illustratively shown therein includes a ring-shaped closeout or annular channel member 72 having a size and form adapted to fit within aperture 48 and between face sheets 54 and 56 of panel 50 whereby closeout member 72 provides increased strength in panel 50 around aperture 48. It will be understood that the size and function of panel 50, considered with such factors as operating stresses and temperatures associated with its function, will determine the form or desirability of providing closeout members such as indicated by reference numeral 72 in FIG. 3, and the scope of the inventive concept disclosed herein is not limited to any particular panel or aperture configuration. Thus, for example, closeout member 72 could conceivably be omitted from the structural arrangement shown by FIG. 3 without altering the inventive subject matter otherwise evidenced by the stated figure.

Figure 4:
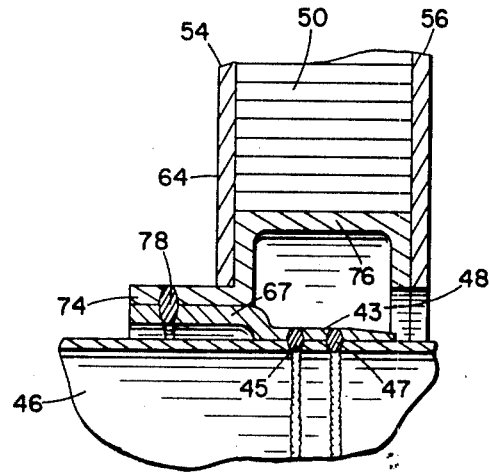
FIG. 4 is an isolated view in cross-section, showing a modification of the structural arrangement shown in FIG. 3.

FIG. 4 shows a modified arrangement of the structure shown in FIG. 3 and discussed above wherein mounting ring or bushing 58 is eliminated and its function is served by a flange portion which may be integrally formed on an insert or closeout member 76 corresponding otherwise in form and function with closeout member 72 discussed above. Thus, flange portion 74 is of annular shape and protrudes outwardly from surface 64 of face sheet 54 of panel 50 as shown by FIG. 4. Flange portion 74 may be united to flange portion 67 to ferrule 43 by a weld joining the distal edges of flanges 67 and 74 in the manner shown and described in connection with weld bead 71 in FIG. 3. However, an alternative type of weld which may advantageously be used instead of that shown in FIG. 3, for example, is also shown in FIG. 4. Thus, weld bead 78 may be generally characterized as a burn-through weld between flange portions 67 and 74 produced by application of welding heat from a heat source located externally with respect to flange 74 whereby welding heat is transmitted through the material in flange 74 and thence into the material in flange 67. Apparatus for accomplishing such a weld is disclosed in copending U.S. patent application Ser. No. 183,891, filed on Mar. 30, 1962, now U.S. Pat. 3,194,936, issued July 13, 1965. It will be understood that the burn-through type weld such as illustratively shown in FIG. 4 may be substituted in place of the burndown weld shown, for example, in FIGS. 2a and 3 without departing from the scope of the inventive concept in this case insofar as the novel tubular or conduit connections in FIGS. 1–4 are concerned. Also, the burn-through welding apparatus mentioned above may be used to join collar or ferrules 42 or 43 to conduit 46 instead of the brazed connection shown in FIGS. 2a and 3, for example, as illustrated by the two burn-through weld beads 45 and 47 in FIG. 4.

Figure 5:
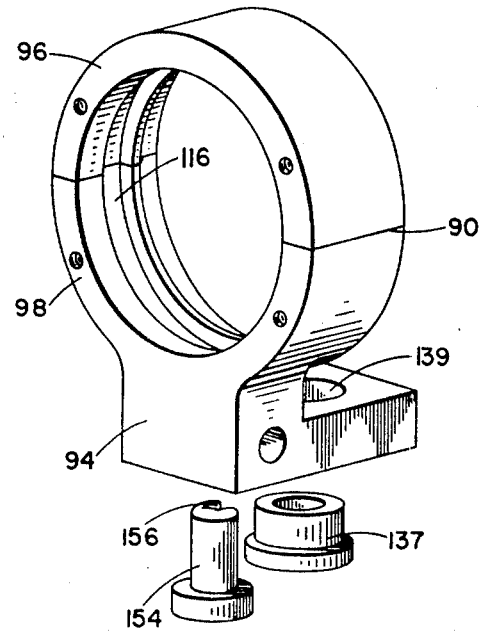
FIG. 5 is an isolated view in perspective of a portion of the apparatus shown in FIGS. 6 and 7.
Figure 6:
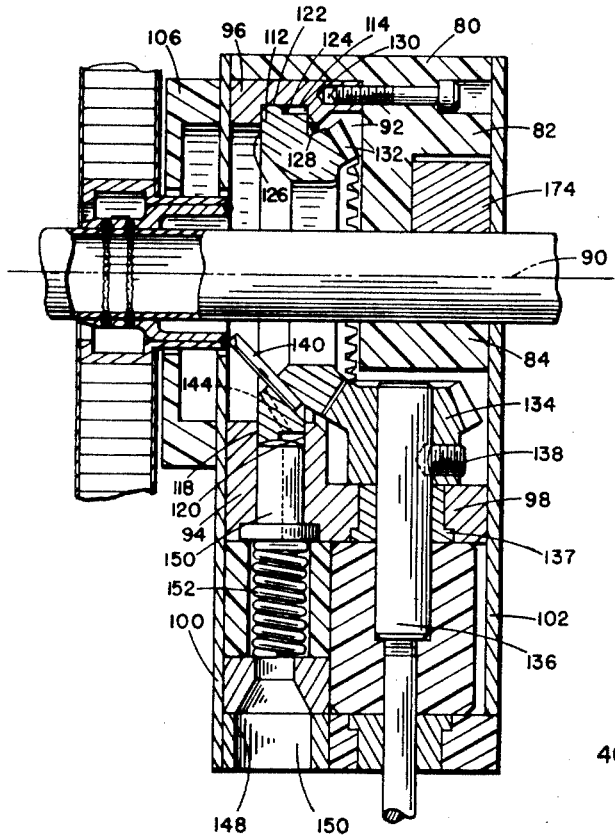
FIG. 6 is a cross-sectional view taken through the center of an illustrative embodiment of apparatus for performing welding as required to make the joint indicated by reference numeral 71 in FIG. 3, for example.
Figure 7:
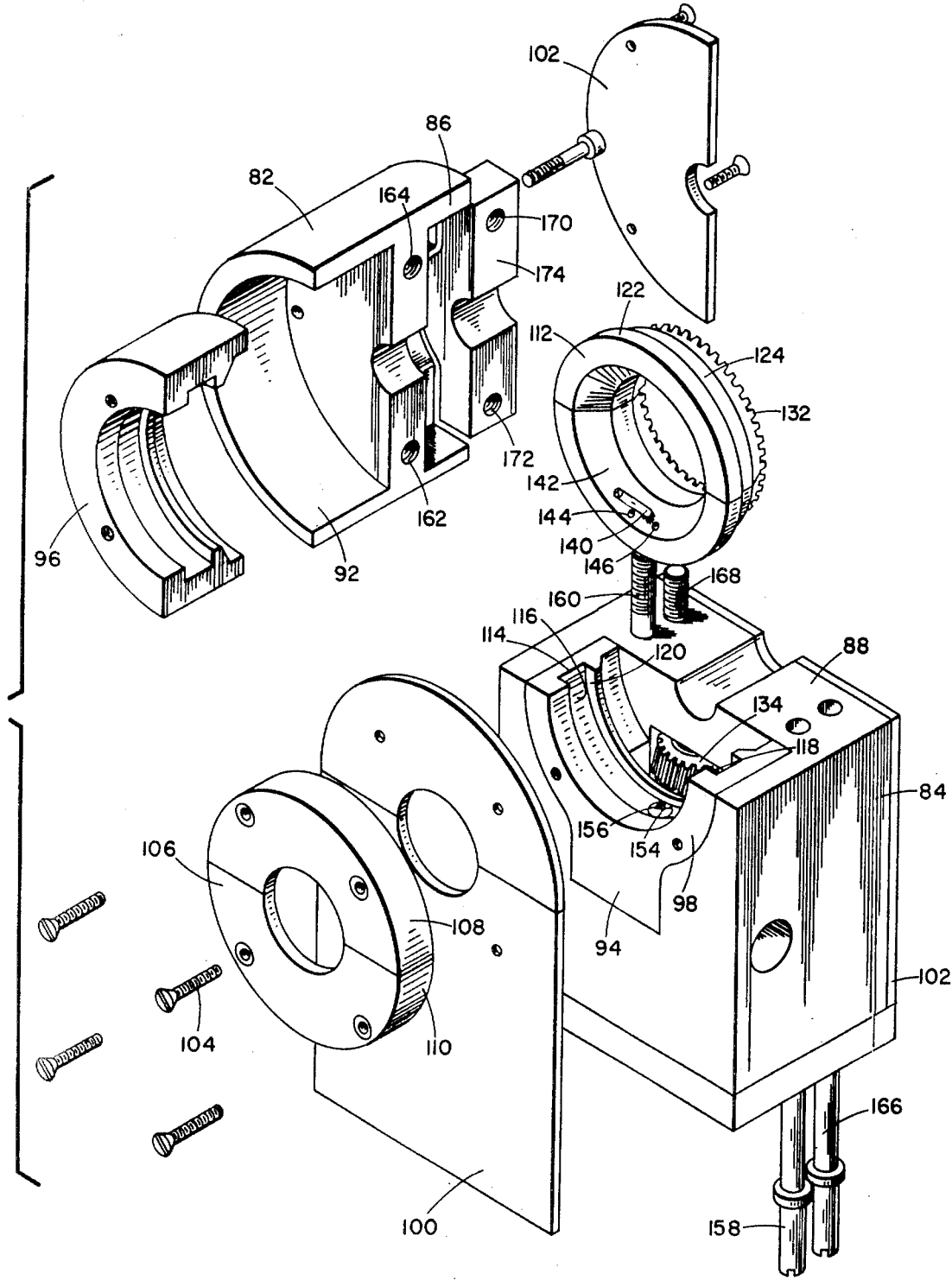
FIG. 7 is an exploded view in perspective of the apparatus of FIG. 6.

Referring to FIGS. 5, 6, and 7, an illustrative embodiment of apparatus adapted to perform burndown welding as required to form annular weld bead 71 between flange distal edges 68 and 70 in FIG. 3, for example, is shown. In FIGS. 6 and 7, it may be seen that the novel apparatus in this case includes a dielectric housing or body portion 80, comprising an upper portion 82 and a lower portion 84 having surfaces 86 and 88, respectively, adapted to contact in operative relationship around portions 60 and 66 of workpiece components 42 and 58, for example, along a plane of separation 90. Housing 80 is provided with a cavity 92 within which a stationary bearing element or mount 94, shown more particularly by FIG. 5, is adapted to fit. Mount 94 is split along plane of separation 90 forming upper portion 96 and lower portion 98. A pair of metallic end plates 100 and 102 are secured to either side of housing 80 by suitable means such as mounting screws 104, each plate being divided along common plane of separation 90. Mounting screws 104 are adapted to hold a gas shield 106, similarly divided in the manner described above and forming portions 108 and 110 shown in FIG. 7, for example.

Considering FIG. 6, it may be seen that rotatable welding means in the form of substantially circular welding ring 112 is adapted to fit in relatively movable bearing contact within bearing element or mount 94. Thus, mount 94 is provided with an annular groove or recess 114 comprising a circumferential bearing surface 116 and two parallel planar radially extending side surfaces 118 and 120. Welding ring 112 is provided with two circumferential surfaces 122 and 124 on the outer periphery thereof and radially spaced apart as shown more particularly in FIG. 6. Parallel planar radially extending surfaces 126 and 128 adjoin circumferential surfaces 122 and 124 in the manner also visible from FIG. 6. Thus, with the parts assembled in operative relationship, it may be seen that continuous circumferential contact occurs between surfaces 118 and 126, between surfaces 120 and 128, and between surfaces 114 and 122, whereby continuous and accurate alignment of welding ring 112 is maintained during rotation of the ring relative to stationary mount 94. Moreover, it may be seen from FIG. 6 that surface 124 of ring 112, being inwardly spaced from surface 114 of mount 94 cooperates therewith to provide an annular chamber 130 between the assembled parts for a purpose described below.

Welding ring 112 is also provided with force transmitting means in the form of annular bevel gear 132 also contained within cavity 92 and operatively engaged with bevel pinion 134 which, together with drive shaft 136 to which the pinion may be appropriately affixed as by set screw 138, forms driving means for causing rotation of welding ring 112 by suitable drive or motor means (not shown) suitably connected with drive shaft 136. A bushing 137 of high wear resistant material is contained in a hole 139 provided in mount 94 for rotatably supporting drive shaft 136.

Welding ring 112 is further provided with welding means in the form of electrode 140 affixed to the ring and rotatable therewith. Beveled surface 142 from which electrode 140 extends is further provided with one or more holes or passages as indicated by reference numerals 144 and 146 in FIG. 7, for example, communicating with chamber 130. The welding tool shown by FIGS. 5, 6, and 7 also incorporates means for supplying electrical power and inerting gas as required for welding by electrode 140. The stated means includes hollow conductive bushing 148 secured at the base of dielectric housing 80. The inner walls of bushing 148 are adapted to contact a suitable external connection element (not shown) and to receive electrical current and inerting gas therefrom. The stated current then passes from bushing 148 through contacting compression coil spring 152 into brush 154, also of conductive material, which is maintained in continuous contact with peripheral surface 122 by springs 152 during rotation of ring 112. Inerting gas received within receptacle 150 is conducted through the center of coil spring 152 into a passage 156 formed within hollow brush 154 and thence into annular chamber 130, through passages 144 and 146, escaping around electrode 140 and filling cavity 92. Gas shield 106 comprises wall means forming a further portion of the gas-filled area during welding, and serves to enclose a generous portion of the workpiece material to insure that the weld area will be free from oxidizing effects during welding.

OPERATION

Although the apparatus shown in FIGS. 5, 6, and 7 and discussed above may be used for the application of heat to a variety of diverse materials and workpieces, and for different purposes, its operation need not in any case differ materially from that described below for the sake of illustration. Prior to use of the apparatus for welding the conduit connections shown in FIGS. 2a, 3, or 4, the workpiece components to be joined must first be positioned in the desired final relationship. Thus, the joint suggested by FIG. 3 requires concentric alignment of flanges 60 and 66 in substantially uniform continuous circumferential contact with each other about a common axial center through aperture 48 and conduit 46, and with flanges 60 and 66 positioned so that their distal edges are substantially in a common plane.

With the workpiece components properly arranged as described, the two halves of welding ring 112 may be positioned in operative relationship with the stated components and the two halves of dielectric housing 80, with the components secured thereto, may be positioned around ring 112 with surface 122 properly contained within annular groove or recess 114. Placement of the parts in the stated relationship will be facilitated by operative engagement of the threaded ends of two throughbolts 158 and 160 shown in FIG. 7, in threaded holes 162 and 164, respectively, with which portion 82 of housing 80 is provided. Rotation of the stated throughbolts pulls the separate portions of ring 112 and housing 80, with parts connected thereto, into close engagement around the workpiece components on either side of plane of separation 90. Thereafter, another pair of throughbolts 166 and 168 engaging holes 170 and 172 on either side of independent tube clamp element 174 may be rotated to pull element 174 into firm clamping relationship with the tubular component of the workpiece to be welded.

Upon completion of the assembly procedures described above, appropriate electrical and inert gas connection is made with the welding fixture and with the workpiece to ground either or both panel 50 or conduit 46, and a flow of inert gas through holes 144 and 146 may precede the actual flow of welding current whereby oxidation and other adverse effects on the workpiece components which might otherwise occur in the heated state are avoided. Flow of the inerting gas is continuously maintained throughout the welding operation. Since the inerting agent may be at a relatively low temperature, the stated procedure provides the additional advantage of cooling the workpiece components in the areas thereof adjacent to the location where welding heat is applied, thus helping to avoid annealing of the workpiece material. Welding is accomplished by electrode 140 by application of electrical power thereto during simultaneous rotation of welding ring 112 by suitable external means such as a constant speed electric motor operating through a flexible cable (not shown) connected to drive shaft 136. Following completion of the welding operation, throughbolts 158, 160, 166 and 168 may be loosened and housing 80 may be separated from around the workpiece components after which welding ring 112 may be similarly separated and removed.

While fabrication of the joint shown in FIGS. 3 and 6 has been illustratively described only in connection with structure shown in FIGS. 5, 6 and 7, it will be understood by those skilled in the art that a generally similar joint could also be fabricated by a burn-through weld of the type shown, for example, in FIG. 4 using the welding apparatus disclosed in aforementioned U.S. Patent 3,194,936.

From the description of structure and its operation as set forth above and shown in the drawings, it may be seen that the invention disclosed herein provides novel means for applying heat such as required for welding operations in relatively remote and in accessible areas. The welding apparatus shown in FIGS. 5, 6 and 7 has been found extremely efficient and compact, and is readily adaptable for welding a variety of different workpiece shapes and sizes, such as elbows, T's, crosses, reducers and the like involving simultaneous burndown welding of two contacting flanges such as 30 and 36 shown in FIG. 2a. The feature which permits separation of the welding apparatus along a common plane of separation and assembly thereof about an immovable and relatively inaccessible workpiece permits great versatility in use of the apparatus. The stated feature adapts the apparatus for in-place welding of fluid lines, tubes and conduits, thus avoiding the necessity for disassembly and removing portions of structure from an aircraft, missile or other vehicle interior as required for bench welding in a workshop. Thus, heat is concentrated at the precise location where welding is accomplished, and is contained within a small local area whereby other lines or structural elements situated close to the welding area are not affected by welding heat. Also, the novel conduit connection resulting from use of the apparatus disclosed herein in the stated manner has been found to possess superior strength with regard to transfer of loads between lightweight panels or bulkhead and tubes or conduits penetrating therethrough in the manner shown in FIG. 3, for example. Thus, the location of the weld bead across distal edges 68 and 70 of flange portions 60 and 66 is sufficiently remote both from conduit 46 and panel 50 so that welding heat applied to fuse together the two stated flanges does not result in degradation of material strength either in the panel or the conduit. Moreover, the novel arrangement of parts in the fittings shown by FIGS. 3 and 4, for example, whereby the flange portions on the ferrule and on the panel insert or bushing extend coaxially about the center axis through both fitting components, results in less overall size and permits removability of the weld bead where burndown welding is used to join the stated components. Thus, for example, removal of weld bead 71 in FIG. 3 would permit separation of conduit 46 from panel 50 for any reason, after which the same or another ferrule similar to ferrule 42, with a conduit attached thereto, could be placed in the relationship shown by FIG. 3 and again welded in place by another weld bead of the form illustrated by bead 71. If flange portions 60 and 66, for example, are made of sufficient length, removal and reinstallation of fitting components may be done many times before insufficient base metal remains to perform any further burndown welding of the stated flanges. Finally, use of individual components such as ferrule 42 and bushing 58 preplaced upon the workpiece components before their in-place joinder to form the novel fitting shown in FIG. 3, for example, permits leak testing of the individual fitting components after their joinder to workpiece components and before their final installation in an aerial vehicle or missile.

While the particular details set forth above and in the drawings are fully capable of attaining the objects and providing the advantages herein stated, the structure and method thus disclosed are merely illustrative and could be varied or modified to produce the same results without departing from the scope of the inventive concept.

We claim:
1. A structural connection between an elongate first member and a panel-like second member having two spaced-apart walls through which said first member extends, said connection consisting of:
  a first portion secured within the boundaries of said spaced-apart walls to said first member, said first portion including a first substantially cylindrical flange-like projection in spaced-apart relationship with said first member,
  a second portion secured to said second member, said second portion including a second substantially cylindrical flange-like projection extending outwardly from one of said surfaces of said second member,
  said first and second flange-like projections being mutually concentric and in continuous, complete circumferential load-transmitting contact, and
  a joint between said first and second flange-like projections joining said flange-like projections to each other.
2. The structure set forth in claim 1 above in which: said joint is welded.
3. The structure set forth in claim 1 above in which: said joint is brazed.
4. In a structural connection between an elongate first member and a panel-like second member having two spaced-apart walls through which said first member extends:
  a first portion secured within the boundaries of said spaced-apart walls to said first member, said first portion including a first substantially cylindrical flange-like projection having a distal edge in the spaced-apart relationship with said first member,
  a second portion secured to said second member, said second portion including a second substantially cylindrical flange-like projection extending outwardly from one of said surfaces of said second member, said second flange-like projection having a distal edge in spaced-apart relationship with said second portion, and said second flange-like projection adapted to fit in close, concentric and load-transmitting relationship with said first flange-like projection in substantially uniform and complete circumferential area contact, and
  a joint between said first and second flange-like projections proximate said distal edges joining said projections to each other.
5. The structure set forth in claim 4 above in which: said joint is welded.
6. The structure set forth in claim 5 above in which: said joint consists of a fusion welded bead across said distal edges.
7. The structure set forth in claim 5 above in which: said joint consists of a brazed joint.
8. A structural connection between a first member of elongate tube-like form, and a panel-like second member having two spaced-apart walls through which said first member extends, said connection consisting of:
  ferrule means having a bearing portion in contact with an outer surface of said first member and permanently secured thereto within the boundaries of said spaced-apart walls in fixed relationship therewith said ferrule means further having a first substantially cylindrical flange-like projection extending from said bearing portion in spaced relationship with said first member,
  said connection further comprising bushing means affixed to said second member and surrounding said first member in space-apart relationship therewith, said bushing means having a second substantially cylindrical flange-like projection extending outwardly from one of said walls of said second member and substantially axially aligned in concentric relationship with said flange-like projection on said ferrule means, and said first and second flange-like projections being in substantially uniform circumferential and complete area contact, and
  a permanent joint between said flange-like projection on said ferrule means and said bushing means joining the same to each other.
9. A structural connection between a first member of elongate tube-like form, and a panel-like second member having two spaced-apart walls through which said first member extends, said connection consisting of:
  ferrule means having a bearing portion in contact with an outer surface of said first member and permanently secured thereto in fixed relationship therewith, said ferrule means further having a first substantially cylindrical flange-like projection extending from said bearing portion in spaced relationship with said first member, said connection further comprising bushing means affixed to said second member and surrounding said first member in spaced apart relationship therewith, said bushing means having a second substantially cylindrical flange-like projection extending outwardly from one of said walls of said second member and substantially axially aligned in concentric relationship with said flange-like projection on said ferrule means, and said first and second flange-like projections being in substantially uniform circumferential and complete area contact, and a permanent joint between said flange-like projection on said ferrule means and said bushing means joining the same to each other, said bushing means comprises an elongate insert extending between said panel walls and secured to each of said walls said flange-like projection on said insert extending outwardly from one of said walls.

10. The structure set forth in claim 8 above in which:
said bushing means includes a bearing surface contacting an outer surface on said second member and secured thereto.

11. The structure set forth in claim 8 above in which:
said flange-like projection on said ferrule is provided with an annular distal edge,
said flange-like projection on said bushing means is provided with an annular distal edge,
said annular distal edges on said ferrule and said bushing means are co-planar, and
said joint comprises an annular weld bead fusing said two edges together.

References Cited

UNITED STATES PATENTS

| | | | |
|---|---|---|---|
| 1,781,848 | 11/1930 | Kelly | 285—280 X |
| 2,198,535 | 4/1940 | James | 285—158 X |
| 2,388,177 | 10/1945 | Patterson et al. | 285—158 X |
| 2,447,259 | 8/1948 | Lucke | 285—286 X |
| 2,792,241 | 5/1957 | Bondley et al. | 285—286 |
| 3,194,591 | 7/1965 | Weisend | 285—158 |

REINALDO P. MACHADO, Primary Examiner

D. W. AROLA, Assistant Examiner

U.S. Cl. X.R.

285—286